US012179206B2

(12) United States Patent
Hoehne

(10) Patent No.: US 12,179,206 B2
(45) Date of Patent: Dec. 31, 2024

(54) CRYOSTAT WITH IMPROVED ACCESSIBILITY FOR EXPERIMENTS

(71) Applicant: Pressure Wave Systems GmbH, Taufkirchen (DE)

(72) Inventor: Jens Hoehne, Taufkirchen (DE)

(73) Assignee: Pressure Wave Systems GmbH, Taufkirchen (DE)

( * ) Notice: Subject to any disclaimer, the term of this patent is extended or adjusted under 35 U.S.C. 154(b) by 668 days.

(21) Appl. No.: 17/474,021

(22) Filed: Sep. 13, 2021

(65) Prior Publication Data

US 2021/0402407 A1 Dec. 30, 2021

Related U.S. Application Data

(63) Continuation-in-part of application No. PCT/EP2020/056053, filed on Mar. 6, 2020.

(30) Foreign Application Priority Data

Mar. 12, 2019 (DE) ......................... 102019203341.5
Mar. 6, 2020 (WO) ................. PCT/EP2020/056053

(51) Int. Cl.
*F17C 3/00* (2006.01)
*B01L 7/00* (2006.01)
*F17C 3/08* (2006.01)

(52) U.S. Cl.
CPC ................ *B01L 7/50* (2013.01); *F17C 3/085* (2013.01); *B01L 2300/1894* (2013.01)

(58) Field of Classification Search
CPC ........ F17C 2201/035; F17C 2201/0166; F17C 2201/0147; F17C 2203/03; F17C 2203/038; F25D 19/006
See application file for complete search history.

(56) References Cited

U.S. PATENT DOCUMENTS 5,597,035 A 1/1997 Smith et al. .............. F28F 7/00 165/80.3
7,474,099 B2 1/2009 Boesel et al. ............ G01V 3/00 324/318

(Continued)

FOREIGN PATENT DOCUMENTS

CN 105350069 A 12/2015
DE 102005041383 A1 3/2007

(Continued)

OTHER PUBLICATIONS

International Search Report of the EPO in the related PCT application PCT/EP2020/056053 dated Jun. 15, 2020 (3 pages).
English translation of the Int'l Search Report of the EPO dated Jun. 15, 2020 (2 pages).
Office action of the German Patent Office in the related German patent application DE102019203341.5 dated Oct. 25, 2019 (7 pages).

(Continued)

*Primary Examiner* — Brian M King
(74) *Attorney, Agent, or Firm* — Imperium Patent Works; Darien K. Wallace

(57) ABSTRACT

A cryostat with improved accessibility for experiments includes a cooling device, a vacuum chamber and multiple cooling levels, heat shields and experimentation places. The cooling device is thermally coupled to cooling levels that have different temperatures. The experimentation places are at the temperatures of the cooling levels and are arranged side by side when viewed from above such that each experimentation place is accessible from above and from the side. Each cooling level has an associated heat shield that also encloses an experimentation place. The vacuum chamber encloses the cooling levels. The cold plate of a second cooling level is arranged above the cold plate of a first cooling level such that a portion of the first cold plate protrudes laterally from under the second cold plate. An experimentation place is disposed above the protruding portion of the first cold plate and is accessible from above and from the side.

17 Claims, 7 Drawing Sheets

(56) References Cited

U.S. PATENT DOCUMENTS

| | | | | |
|---|---|---|---|---|
| 9,062,905 | B2 | 6/2015 | Hoehne et al. | F25D 19/00 |
| 10,175,315 | B2 | 1/2019 | Hinderer et al. | G01R 33/38 |
| 2006/0096301 | A1 | 5/2006 | Triebe et al. | F25B 9/00 62/6 |
| 2018/0045797 | A1* | 2/2018 | Hinderer | H01F 6/04 |
| 2019/0220770 | A1* | 7/2019 | Amini | G06N 10/00 |
| 2023/0012324 | A1* | 1/2023 | Tillemann-Dick | F25B 9/145 |

FOREIGN PATENT DOCUMENTS

| | | | | | |
|---|---|---|---|---|---|
| DE | 102011115303 | A1 | | 4/2013 | |
| DE | 102016214731 | B3 | | 7/2017 | |
| GB | 1410800 | A | | 12/1972 | |
| GB | 2592380 | A | * | 9/2021 | F25B 9/10 |
| JP | 2006-096301 | A | | 9/2001 | |
| WO | WO2009/000629 | | | 12/2008 | |
| WO | WO2010/106309 | A2 | | 9/2010 | |

OTHER PUBLICATIONS

English translation of Office action of German Patent Office dated Oct. 25, 2019 (7 pages).

Notice of Allowance of the Japanese Patent Office in the related Japanese patent application JP2021-554745 dated Jan. 9, 2024 (1 page).

Office action of the Chinese Patent Office in the related Chinese patent application CN202080020221.9 dated Jul. 5, 2022, as well as the English translation of the Chinese Office action (18 pages).

"Equipment of Medical Imaging," Han Fongtan et al., People's Medical Publishing House Co., LTD, Jul. 31, 2010, second edition, pp. 303-304, as well as the English translation of the article (10 pages).

Office action of the Chinese Patent Office in the related Chinese patent application CN202080020221.9 dated Apr. 13, 2023, as well as the English translation of the Chinese Office action (24 pages).

* cited by examiner

CRYOSTAT WITH IMPROVED ACCESSIBILITY FOR EXPERIMENTS

CROSS REFERENCE TO RELATED APPLICATION

This application is filed under 35 U.S.C. § 111(a) and is based on and hereby claims priority under 35 U.S.C. § 120 and § 365(c) from International Application No. PCT/EP2020/056053, filed on Mar. 6, 2020, and published as WO 2020/182671 A1 on Sep. 17, 2020, which in turn claims priority from German Application No. 102019203341.5, filed in Germany on Mar. 12, 2019. This application is a continuation-in-part of International Application No. PCT/EP2020/056053, which is a continuation of German Application No. 102019203341.5. International Application No. PCT/EP2020/056053 is pending as of the filing date of this application, and the United States is an elected state in International Application No. PCT/EP2020/056053. This application claims the benefit under 35 U.S.C. § 119 from German Application No. 102019203341.5. The disclosure of each of the foregoing documents is incorporated herein by reference.

TECHNICAL FIELD

The present disclosure relates to a cryostat for experiments at temperatures in the range below 2K.

BACKGROUND

Cryostats and in particular dilution cryostats for temperatures in the range below 2K are currently required and built essentially for the development of quantum computers and quantum communication devices. The arrangement of the individual temperature levels or cold plates and thus also the arrangement of experimentation places is given by the vertical arrangement of conventional cryostats FIGS. 7A-7B (prior art) schematically show a dilution cryostat according to the prior art with a suspended, vertical structure. The dilution cryostat according to FIG. 7A and FIG. 7B comprises six cooling levels 2-1 to 2-6 with four experimentation places 4-1 to 4-4. The range of the room temperature is not provided as an experimentation place. The temperature levels of the six cooling levels 2-1 to 2-6 are provided by three cooling devices not specified in detail.

A first cooling device not shown in detail, e.g., a first level of a Gifford-McMahon (GM) cooler, comprises a first cold plate 8-1 with the first experimentation place 4-1 arranged below the first cold plate 8-1. The first cooling level 2-1 provides a temperature level of about 50K for the first experimentation place 4-1.

A second cooling device not shown in detail, e.g., a second level of the GM cooler, comprises a second cold plate 8-2 arranged below the first experimentation place 4-1. The second cold plate 8-2 or the second cooling level 2-2 has a temperature level of about 4K. The second experimentation place 4-2 is arranged below the second cold plate 8-2 at the temperature level of the second cooling level 2-2. A third cold plate 8-3 of a third cooling level 2-3 having a temperature level of about 1K is arranged below the second experimentation place 4-2. The third cooling level 2-3 is cooled by a third cooling device not shown in detail, e.g., a Joule-Thomson level.

A fourth cooling device not shown in detail, e.g., a $^3He/^4He$ dilution refrigerator system, provides the temperature levels of the fourth, fifth and sixth cooling levels 2-4,

2-5 and 2-6. The third experimentation place 4-3 is disposed on the fourth cooling level 2-4 between the fourth cold plate 8-4 and the fifth cold plate 8-5. A sixth cold plate 8-6 of the lowest cooling level 2-6 is disposed below the third experimentation place 4-3 and below the fifth cold plate 8-5. The temperature level of the fourth cold plate 8-4 is in the range between 500-700 mK. The temperature level of the fifth cold plate 8-5 is between 100-200 mK. The lowest temperature level of the sixth cold plate 8-6 and the fourth experimentation place 4-4 located below it is in the range of <100 mK.

The entire arrangement is arranged in a vacuum chamber 10. Within the vacuum chamber 10, all six cooling levels 2-1 to 2-6 are surrounded by a first heat shield 12-1. Within the first heat shield 12-1, the second to sixth cooling levels 6-2 to 6-6 are surrounded by a second heat shield 12-2. Within the second heat shield 12-2, the fourth to sixth cooling levels 2-4 to 2-6 are surrounded by a third heat shield 12-3. The lowest, sixth cooling level 2-6 is shielded by a fourth heat shield 12-4.

This conventional arrangement has the advantage that the individual temperature levels lie inside each other like onion skins and are easy to manufacture, as shown in FIG. 7B. However, due to the increasing requirements in terms of experimentation places at the individual levels, these known cryostats are becoming relatively large and, above all, tall or long. As a consequence, the heat shields become longer and longer and either have to be divided, or a lot of space has to be provided underneath the apparatus in order to be able to remove the heat shields to access the experimentation places. Furthermore, all structures at the individual levels have to be suspended because experimentation places are provided inside the heat shields under the cold plate of the corresponding temperature level.

A so-called tabletop dilution cryostat is described in the article by Kurt Uhlig, "Concepts for a low-vibration and cryogen-free tabletop dilution refrigerator," in Cryogencis 87 (2017) 29-34. The tabletop dilution cryostat allows a smaller construction volume due to the arrangement of still and mixing chambers, but has the same disadvantage as the prior art according to FIGS. 7A-7B, i.e., the individual cold plates or experimentation places are only accessible from the side.

DE 102014015665B4 describes an optical table that has a single cold plate integrated into the tabletop.

DE102016214731B3, DE102005041383A1 and DE102011115303A1 disclose NMR apparatuses or cryogenic devices in which sample head components are arranged on different temperature levels when viewed from above, below or above each other. The figure of DE102011115303A1 shows that two sample heads are arranged horizontally and are vertically offset from each other. However, DE102011115303A1 provides no written disclosure of this arrangement.

It is therefore the object of the present invention to provide a cryostat that allows improved accessibility of the experimentation places and at the same time requires a smaller construction volume.

SUMMARY

The present document discloses a cryostat for experiments in temperatures below 2K which permits improved accessibility for the experimentation places and also a smaller construction volume. Because the experimentation places are arranged next to one another instead of one below the other, after removal of the respective heat shields these places are accessible from above and from the side, whereas in the prior art they are accessible only from the side. This simplifies various experiments and more generally the handling of the cryostat during use. The side-by-side arrangement of the experimentation places also substantially reduces the construction height of the cryostat, and it is possible to operate the cryostat in standard-height laboratory spaces, which is not possible with cryostats having a vertically suspended arrangement. Although the side-by-side arrangement of the experimentation places can lead to heat shields having a larger surface area, this drawback (increased cooling power from the various coolers being necessary for operation) is compensated by the ability to use the cryostat in standard-height laboratory spaces.

In one embodiment, a novel cryostat with improved accessibility for experiments includes a cooling device, a vacuum chamber and multiple cooling levels, heat shields and experimentation places. The cooling device is thermally coupled to multiple cooling levels that have different temperature levels during operation of the cryostat. The experimentation places are at the temperature levels of the cooling levels and are arranged side by side when viewed from above such that each of the experimentation places is accessible from above and from the side. The heat shields are associated with the cooling levels and enclose the experimentation places. The vacuum chamber encloses the cooling levels. For example, the cold plate of a second cooling level is arranged above the cold plate of a first cooling level such that a portion of the first cold plate protrudes laterally out from under the second cold plate. An experimentation place is disposed above the laterally protruding portion of the first cold plate and is accessible from above the cryostat and from the side of the cryostat.

In another embodiment, a cryostat includes first and second cold plates, first and second heat shields, first and second cooling devices, and a vacuum chamber. The first cold plate forms a first base of a first cooling level. The first heat shield encloses the first cooling level above the first cold plate. The second cold plate forms a second base of a second cooling level. The second heat shield encloses the second cooling level above the second cold plate. The second cooling level is enclosed by the first cooling level. The first cooling device is thermally coupled by a first heat conductor to the first cold plate. The second cooling device is disposed within the second cooling level and is thermally coupled by a second heat conductor to the second cold plate. The second cold plate is disposed above the first cold plate. A portion of the first cold plate protrudes laterally out from under the second cold plate such that the laterally protruding portion of the first cold plate is not covered by the second cold plate. A first experimentation place is disposed above the laterally protruding portion of the first cold plate. The first heat shield encloses the first experimentation place. The vacuum chamber encloses the first cooling level and the second cooling level.

A second experimentation place is disposed above the second cold plate, and the second heat shield encloses the second experimentation place. The second experimentation place is accessible from above the cryostat and from the side of the cryostat. The first experimentation place and the second experimentation place are arranged side by side when viewed from above the cryostat. Both the first and second experimentation places are accessible from above the cryostat and from the side of the cryostat.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 2A:
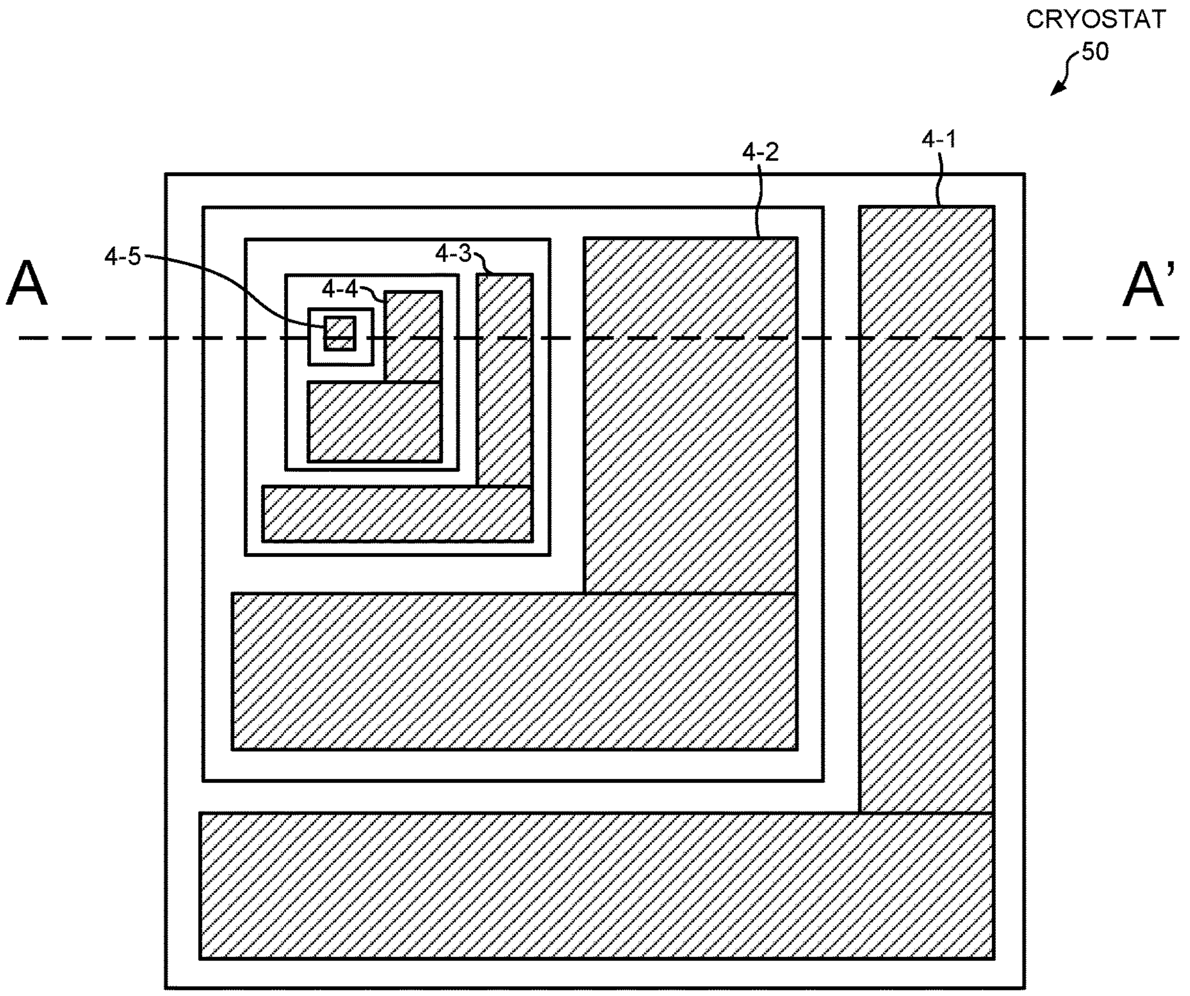
FIG. 2A and FIG. 2B show the geometrical structure of a first embodiment of the invention.
Figure 2B:
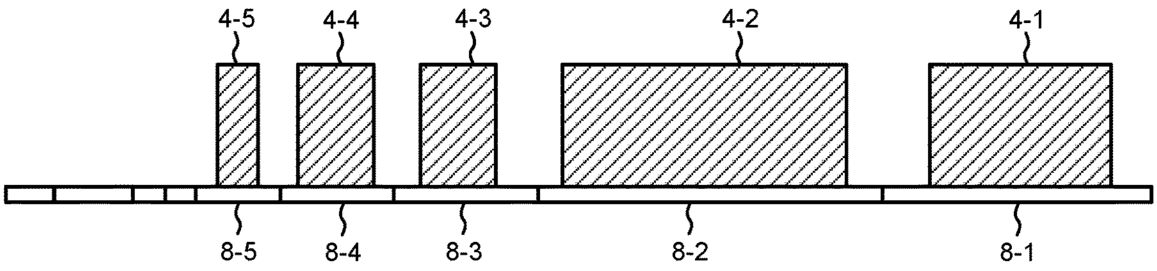

FIGS. 2A-2B show a first embodiment of a novel cryostat 50 that provides improved accessibility for experiments. The cryostat 50 has experimentation places 4-1 to 4-5 that are not arranged one below the other, as in the prior art, but rather side by side, such that they are accessible from above and from the side after removal of the respective heat shields 32-1 to 32-4. On the other hand, the experimentation places of the prior art are accessible only from the side.

The arrangement of the experimentation places of the cryostat 50 simplifies various experiments and generally the handling of the cryostat in use. By arranging the experimentation places 4-1 to 4-5 side by side, the construction height of the cryostat 50 is also significantly reduced, and it is possible to operate the cryostat in laboratory rooms of standard height, which is not possible with cryostats that have a vertically suspended arrangement. Although the side-by-side arrangement of the experimentation places of the cryostat 50 may lead to heat shields 32-1 to 32-4 with a larger surface area, this disadvantage (increased cooling power of the various coolers is required for operation) is accepted by the possibility of use in laboratory rooms with standard height.

In a preferred configuration of the cryostat 50, care is taken in the side-by-side arrangement of the experimentation places 4-1 to 4-5 to ensure that they are accessible from above and from one side.

Figure 4:
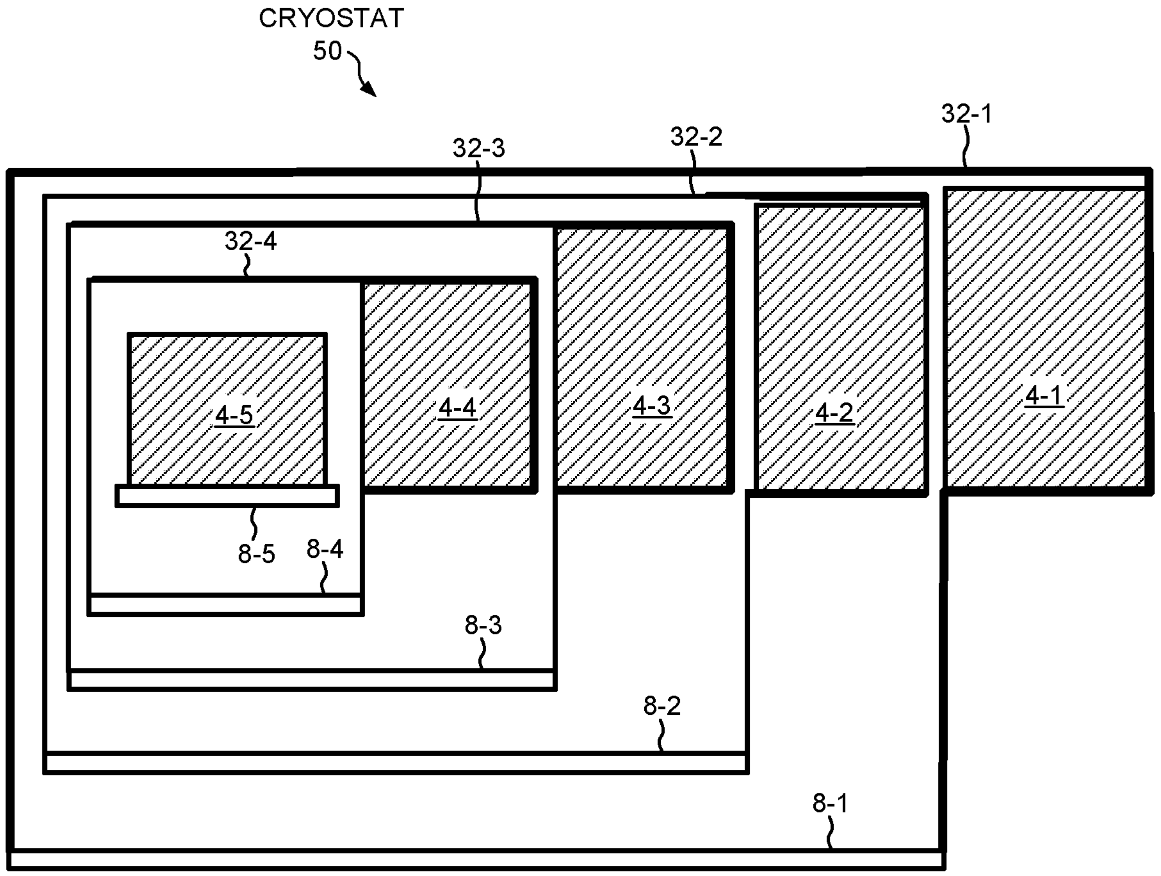
FIG. 4 shows the arrangement of the heat shields in the embodiments according to FIGS. 2A-2B and FIG. 3.

FIG. 4 illustrates the advantageous configuration of the cryostat 50 in which multiple cooling levels 8-1 to 8-5 are served by one dilution refrigerator 34. Advantageous configurations of the invention relate to suitable cooling devices for the cryostat. The advantageous configuration of the cryostat 50 provides a simple side-by-side arrangement of the experimentation places 4-1 to 4-5, wherein they are maintained at different temperature levels. The advantageous configuration of the cryostat 50 provides experimentation places 4-1 to 4-5 arranged side by side, which are at approximately the same height level.

Figure 1A:
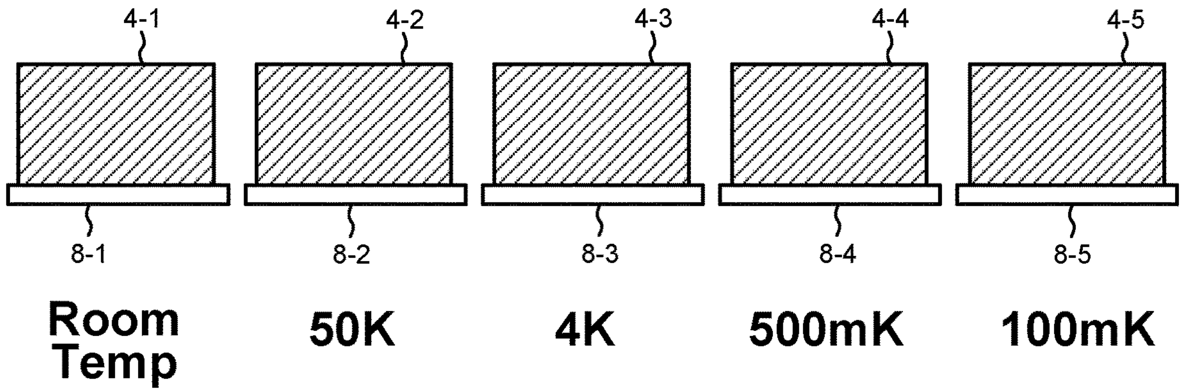
FIG. 1A and FIG. 1B schematically show the basic idea of the present invention.
Figure 1B:
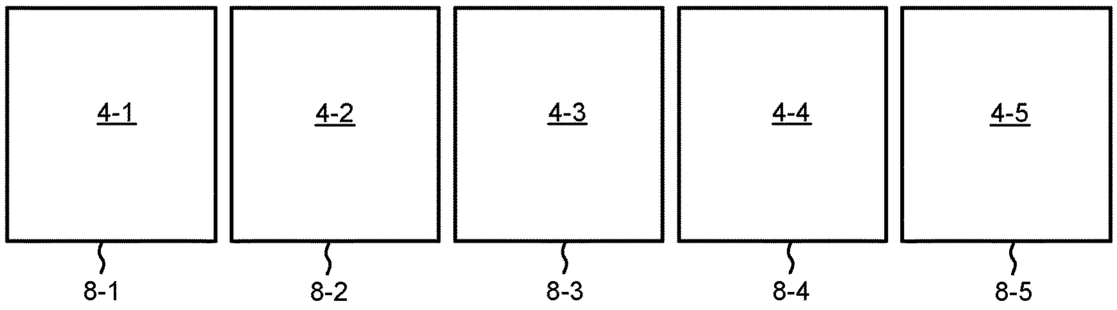

FIG. 1A and FIG. 1B schematically show the basic principle of the present invention, the side-by-side arrangement of five experimentation places 4-1 to 4-5 on the cold plates 8-1 to 8-5 in one plane. The five experimentation places 4-1 to 4-5 are arranged on the cooling levels 2-1 to 2-5 that have the respective temperatures, room temperature, 50K, 4K, 700 mK and 100 mK.

FIG. 1A is a side view of the experimentation places arranged side by side and shows approximately the volume of the experimentation places 4-1 to 4-5 above the respective cold plate 8-1 to 8-5. FIG. 1B shows a top view of the illustration of FIG. 1.

FIG. 2A and FIG. 2B show a first embodiment of the invention, in which the cryostat 50 has a rectangular cross-sectional shape. The individual experimentation places 4-1 to 4-4 are arranged side by side in a plane are nested within each other in L-shapes. The fifth experimentation place 4-5 is a cube that fits into the L-shape of the experimentation place 4-4. FIG. 2B is a cross-sectional view of the cryostat 50 in the plane A-A' shown in the figure of FIG. 2A.

Figure 3:
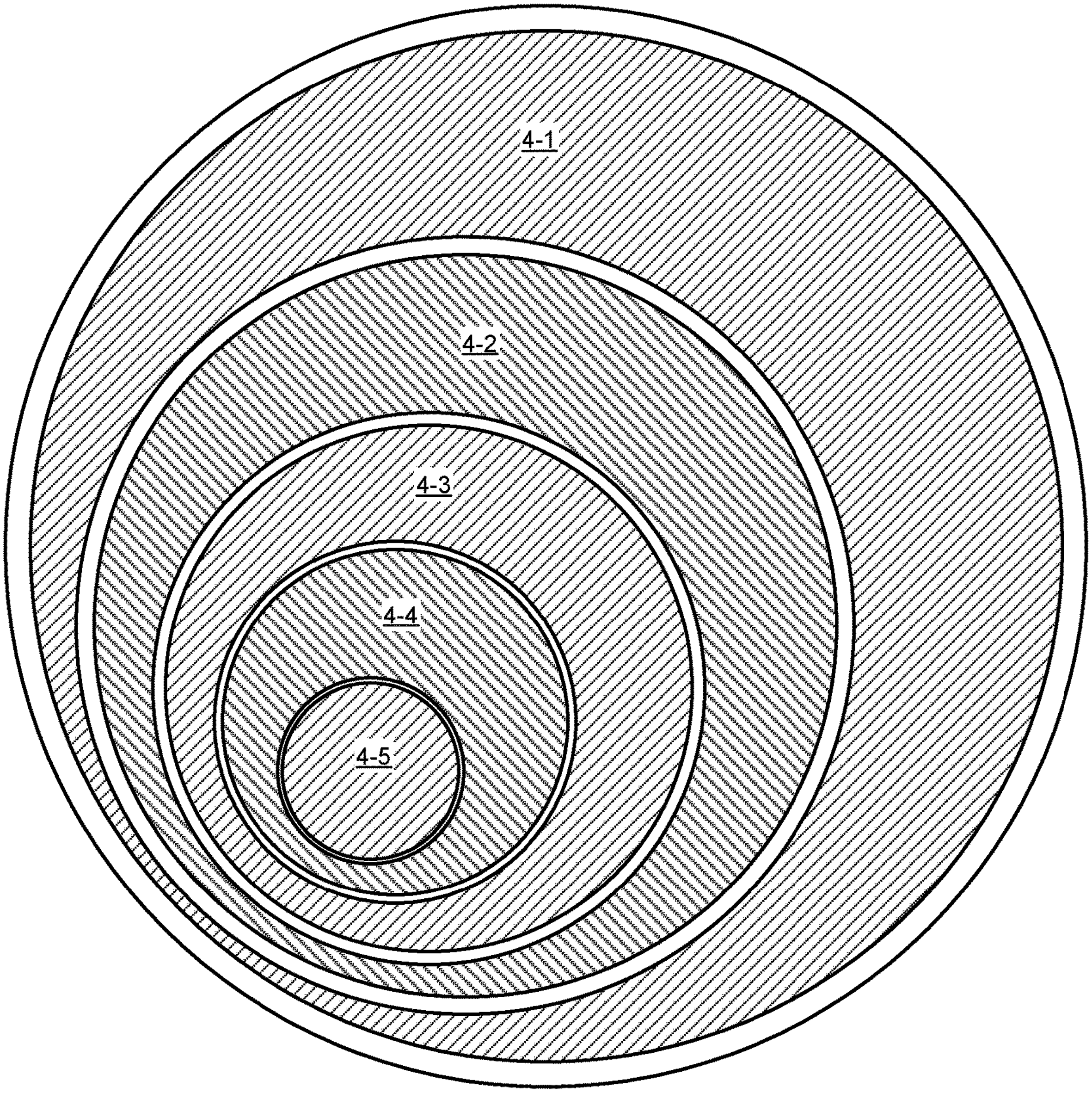
FIG. 3 shows the geometrical structure of a second embodiment of the invention.

FIG. 3 shows a second embodiment of the invention in which the basic structure is circular or cylindrical as opposed to rectangular and cubic as in the first embodiment. The individual experimentation places 4-1 to 4-5 in the second embodiment surround each other.

FIG. 4 illustrates how four heat shields 32-1 to 32-4 can be arranged around the components of the individual embodiments of FIGS. 2 and 3.

Figure 5:
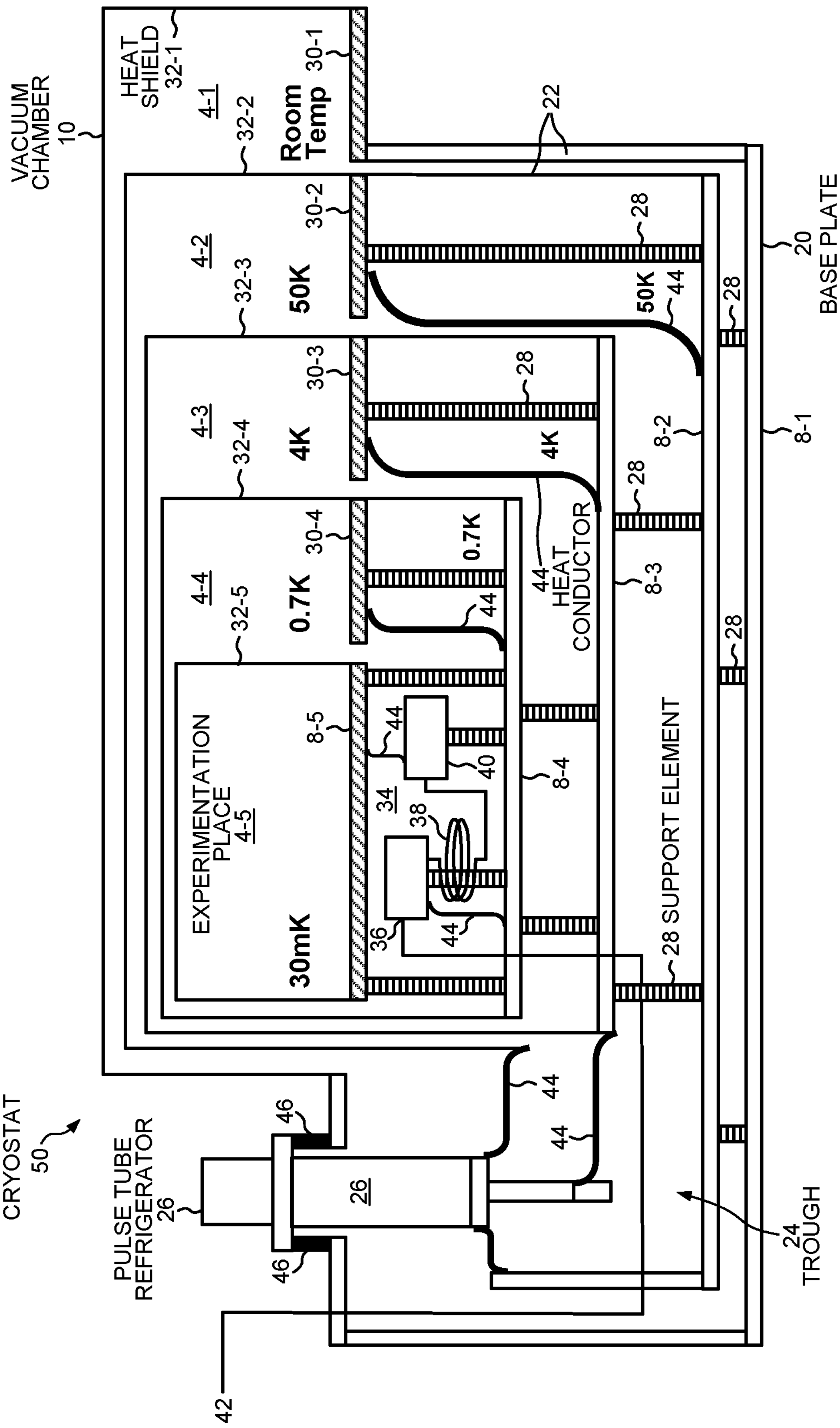
FIG. 5 shows a third embodiment of the invention with the experimentation places arranged side by side in one plane.

FIG. 5 shows a third embodiment of the invention. The individual components of the cryostat 50 are arranged in a vacuum chamber 10. The vacuum chamber 10 includes a base plate 20 on which a lateral circumferential border 22 is arranged, resulting in a trough 24. A pulse tube refrigerator 26 extends into the trough 24 on the left side of the trough 24. The right side of the lateral circumferential border 22 supports a first partial cold plate 30-1 at room temperature. A first experimentation place 4-1 is arranged on the first partial cold plate 30-1. The first experimentation place 4-1 is surrounded by a first heat shield 32-1 and is at room temperature. The entire vacuum chamber 10 constitutes the first heat shield 32-1.

A second cold plate 8-2 is provided which is spaced from the base plate 20 by support elements 28 and which is in thermal contact with the pulse tube refrigerator 26 and which also has a lateral circumferential border 22. In the right edge region of the second cold plate 8-2, a support element 28 supports a second partial cold plate 30-2 which is offset upwards and is located in the plane of the first partial cold plate 30-1. The second cold plate 8-2 and the second partial cold plate 30-2 are at a second temperature level of approximately 50K. A second experimentation place 4-2 is located on or above the second partial cold plate 30-2. Starting from the second cold plate 8-2, a second heat shield 32-2 encloses the second experimentation place 4-2.

Again spaced apart by support elements 28, a third cold plate 8-3 is arranged on the second cold plate 8-2 and is again thermally coupled to the pulse tube refrigerator 26 and provides a temperature level of about 4K. A support element 28 on the right side of the third cold plate 8-3 supports a third partial cold plate 30-3 offset upwards. The third partial cold plate 30-3 is located in the plane of the first and second partial cold plates 30-1 and 30-2. A third experimentation place 4-3 with a temperature level of approximately 4K is located on or above the third partial cold plate 30-3. Starting from the third cold plate 8-3, a third heat shield 32-3 encloses the third experimentation place 4-3.

Again spaced apart by support elements 28, a fourth cold plate 8-4 is arranged above the third cold plate 8-3 and has the components of a $^3$He/$^4$He dilution refrigerator 34 arranged thereon. On the right side of the fourth cold plate 8-4, a support element 28 supports a fourth partial cold plate 30-4 offset upwards at the height level of the other partial cold plates 30-1 to 30-3.

In other embodiments, the cooler arranged on the fourth cold plate 8-4 is a Joule-Thomson cooler, a 1-K pot, a $^3$He level refrigerator, or an adiabatic demagnetization refrigerator (ADR) cooler.

Via further support elements or support walls 28, a fifth cold plate 8-5 is arranged above the fourth cold plate 8-4 at the height level of the partial cold plates **30-*i* at the lowest temperature level of approximately 30 mK. A fifth experimentation place 4-5 is arranged above or on the fifth cold plate 8-5. Starting from the fifth cold plate 8-5, a fifth heat shield 32-5 surrounds the fifth experimentation place 8-5**.

The $^3$He/$^4$He dilution refrigerator 34 between the fourth and fifth cold plates 8-4, 8-5 includes a still 36 with concentric heat exchanger 38, a mixing chamber 40, and ports 42. The still 36 is thermally coupled to the fourth cold plate 8-4 and to the fourth partial cold plate 30-4. The mixing chamber 40 is thermally coupled to the fifth cold plate 8-5.

The thermal coupling of the individual cold plates **8-*i* with the partial cold plates 30-*i* and the pulse tube refrigerator 26 or the $^3$He/$^4$He dilution refrigerator 34 takes place through heat conductors 44. The pulse tube refrigerator 26 is mounted in the vacuum chamber 10 via a vibration decoupler 46**.

Figure 6:
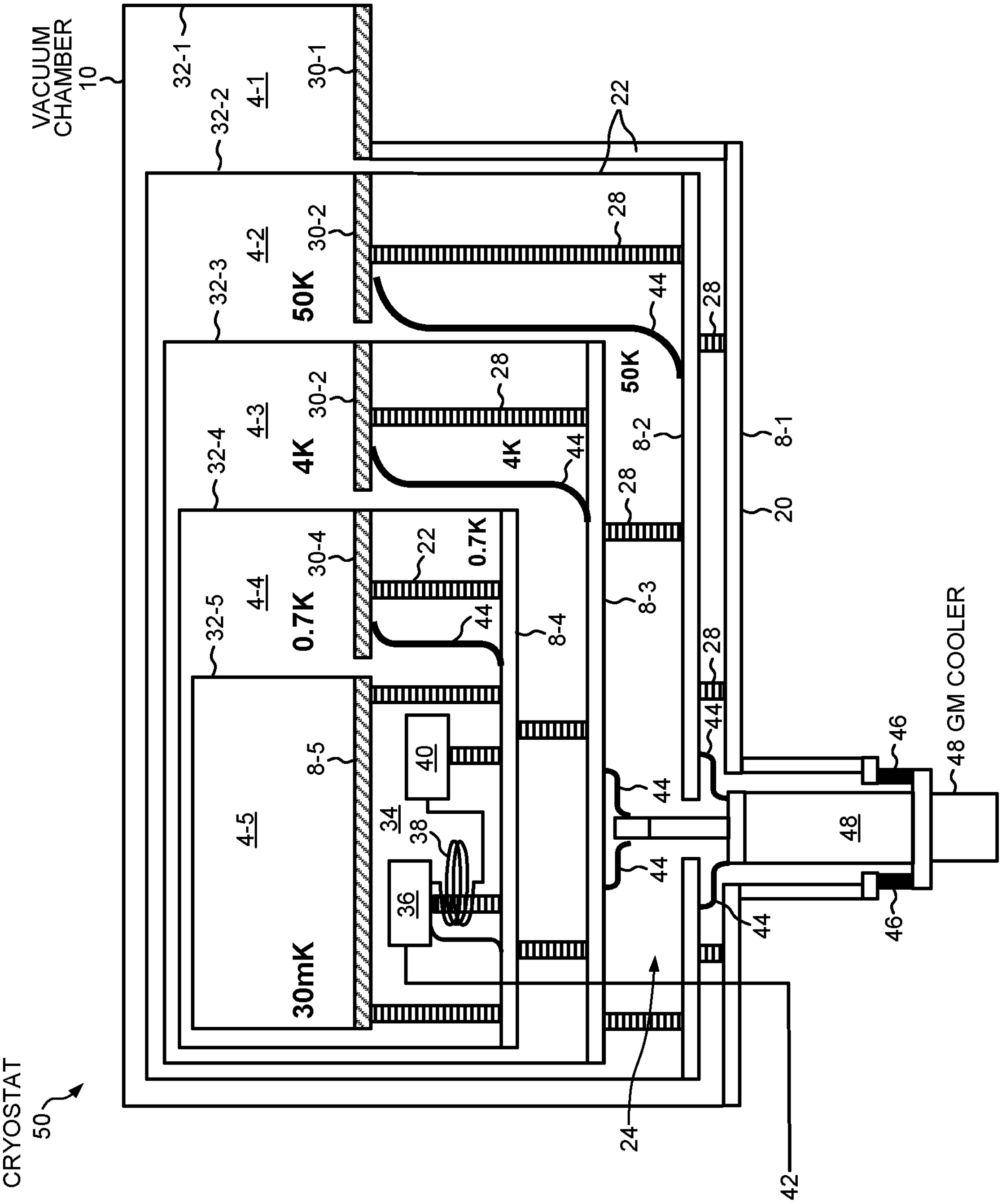
FIG. 6 shows a fourth embodiment of the invention in which a GM cooler passes through the vacuum chamber from below.
Figure 7A:
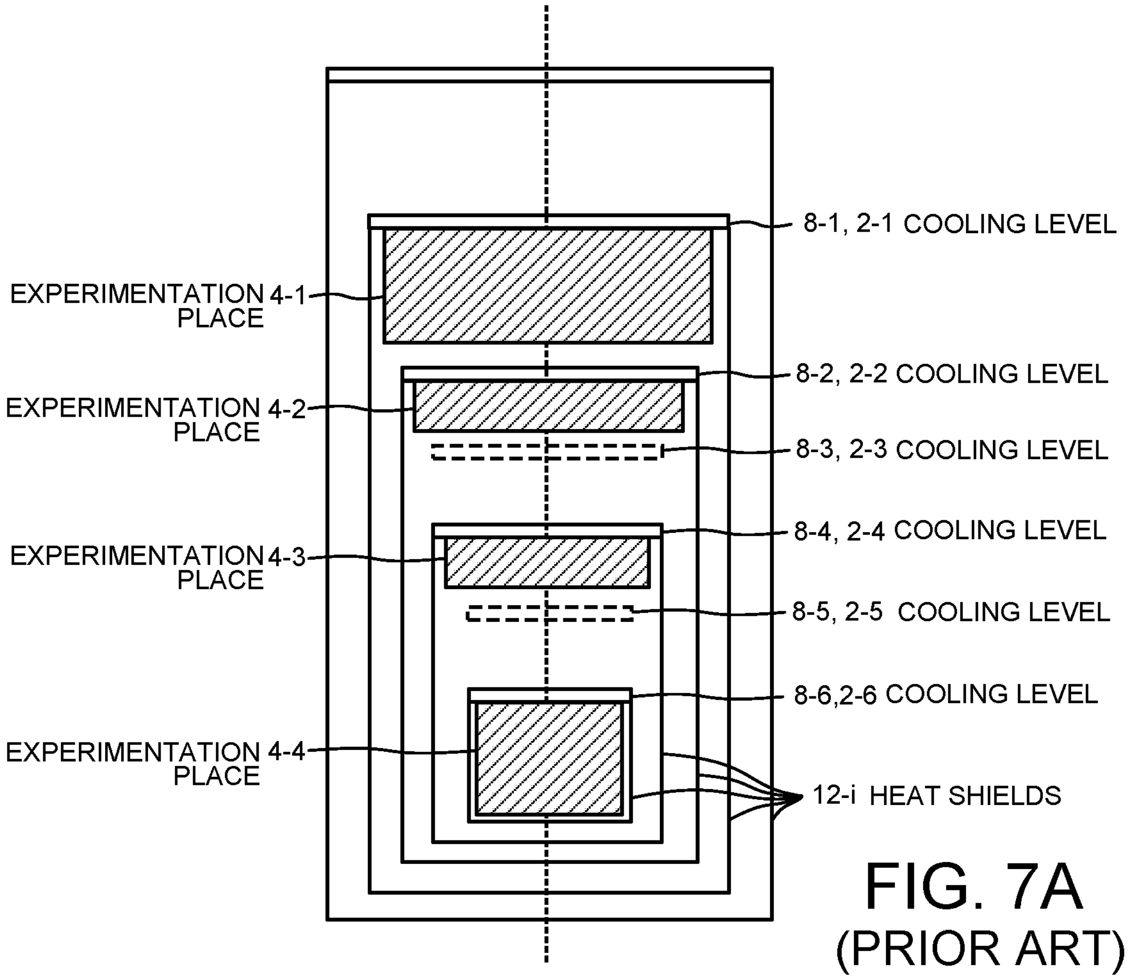
FIG. 7A (PRIOR ART)
FIG. 7A and FIG. 7B (prior art) show a cryostat according to the prior art.
Figure 7B:
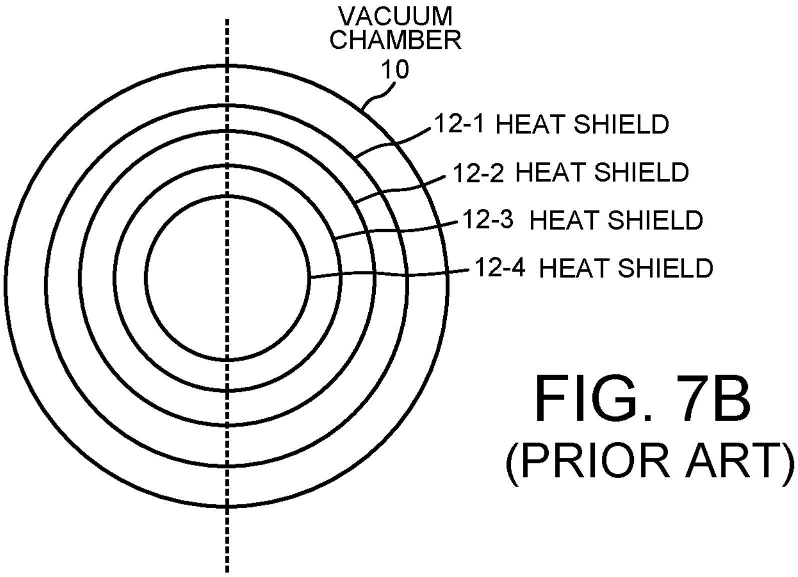
FIG. 7B (PRIOR ART)

FIG. 6 shows a fourth embodiment of the invention, which differs from the third embodiment shown in FIG. 5 in that instead of a pulse tube refrigerator passing through the vacuum chamber 10 from the side, a GM cooler 48 passes through the vacuum chamber 10 from below approximately in the center of the fifth cold plate 8-5. The GM cooler 48 also passes through an opening in the second cold plate 8-2 so that thermal coupling can occur with the third heat plate. Installing the GM cooler 48 from below results in a slightly narrower, but slightly higher construction.

As can be seen from the sectional views in FIGS. 5 and 6, the side-by-side arrangement of the experimentation places **4-*i* enables a substantially lower construction height. Due to the low construction height of the cryostat 50**, it is possible to operate the cryostat in laboratory rooms of standard height, which is not possible with cryostats with vertically suspended arrangement. Although the side-by-side arrangement of the experimentation places may lead to larger heat shields, this disadvantage (increased cooling power of the various coolers necessary for operation) is accepted by the possibility of use in laboratory rooms with standard height.

REFERENCE NUMERALS

**2-*i*** cooling levels
**4-*i*** experimentation places
**8-*i*** cold plates
10 vacuum chamber
**12-*i*** heat shields
20 base plate
22 lateral circumferential border of 20, 8-2
24 trough
26 pulse tube refrigerator
28 support elements
**30-*i*** partial cold plate
**32-*i*** heat shield
34 $^3$He/$^4$He dilution refrigerator
36 still
38 concentric heat exchanger 40 mixing chamber
42 ports of 34
44 heat conductor
46 vibration decoupler
48 GM cooler
50 cryostat Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A cryostat, comprising:
a first cold plate that forms a first base of a first experimental place;
a first heat shield that encloses the first experimental place, wherein the first cold plate and the first experimental place are surrounded by the first heat shield and form a first cooling level;
a second cold plate that forms a second base of a second experimental place;
a second heat shield that encloses the second experimental place, wherein the second cold plate and the second experimental place are surrounded by the second heat shield and form a second cooling level, wherein the second cold plate and the second heat shield are enclosed by the first heat shield such that the second cooling level is enclosed by the first cooling level;
a vacuum chamber that encloses the first cooling level and the second cooling level;
a cryo-cooler that is thermally coupled to the first cold plate and the second cold plate, wherein the first cold plate and the second cold plate are arranged side by side in the same plane, and wherein the first experimental place and the second experimental place are arranged side by side such that they are accessible after removal of the first heat shield and the second heat shield from all sides except the side of the first cold plate and the second cold plate.

2. The cryostat of claim 1, wherein the cryo-cooler comprises a first cooler portion and a second cooler portion, wherein the first cooler portion is thermally coupled by a first heat conductor to the first cold plate, and wherein the second cooler portion is thermally coupled by a second heat conductor to the second cold plate.

3. The cryostat of claim 2, wherein the first cooler portion is a Gifford-McMahon cooler or a pulse tube refrigerator; and wherein the second cooler portion is a Joule-Thomson cooler.

4. The cryostat of claim 2, wherein the first cooler portion and the second cooler portion are first and second levels of a Gifford-McMahon cooler.

5. The cryostat of claim 2, wherein the first cooler portion and the second cooler portion are first and second levels of a pulse tube refrigerator.

6. The cryostat of claim 2, further comprising:
a third cold plate that forms a third base of a third experimental place; and
a third heat shield that encloses the third experimental place, wherein the third cold plate and the third experimental place are surrounded by the third heat shield and form a third cooling level, wherein the third cold plate and the third heat shield are enclosed by the second heat shield such that the third cooling level is enclosed by the second cooling level, wherein the vacuum chamber encloses the first cooling level, the second cooling level and the third cooling level, wherein the cryo-cooler comprises a third cooler portion, wherein the third cooler portion is thermally coupled by a third heat conductor to the third cold plate, wherein the first cold plate, the second cold plate and the third cold plate are arranged side by side in the same plane, and wherein the first experimental place, the second experimental place and the third experimental place are arranged side by side such that they are accessible after removal of the first heat shield, the second heat shield and the third heat shield from all sides except from the side of the first cold plate, the second cold plate and the third cold plate.

7. The cryostat of claim 6, wherein the third cooler portion is selected from the group consisting of: a Joule Thomson cooler, a 1-K pot, a $^{3}He$ level refrigerator, and an adiabatic demagnetization refrigerator (ADR) cooler.

8. The cryostat of claim 6, further comprising:
a fourth cold plate that forms a fourth base of a fourth experimental place; and
a fourth heat shield that encloses the fourth experimental place, wherein the fourth cold plate and the fourth experimental place are surrounded by the fourth heat shield and form a fourth cooling level, wherein the fourth cold plate and the fourth heat shield are enclosed by the third heat shield such that the fourth cooling level is enclosed by the third cooling level, wherein the vacuum chamber encloses the first cooling level, the second cooling level, the third cooling level and the fourth cooling level, wherein the cryo-cooler comprises a fourth cooler portion, wherein the fourth cooler portion is thermally coupled by a fourth heat conductor to the fourth cold plate, wherein the first cold plate, the second cold plate, the third cold plate, and the fourth cold plate are arranged side by side in the same plane, and wherein the first experimental place, the second experimental place, the third experimental place and the fourth experimental place are arranged side by side such that they are accessible after removal of the first heat shield, the second heat shield, the third heat shield, and the fourth heat shield from all sides except from the side of the first cold plate, the second cold plate, the third cold plate and the fourth cold plate.

9. The cryostat of claim 8, wherein the fourth cooler portion is selected from the group consisting of: a 1-K pot, a $^{3}He$ level refrigerator, a $^{3}He/^{4}He$ dilution refrigerator, and an adiabatic demagnetization refrigerator (ADR) cooler.

10. The cryostat of claim 8, further comprising:
a fifth cold plate that forms a fifth base of a fifth experimental place; and
a fifth heat shield that encloses the fifth experimental place, wherein the fifth cold plate and the fifth experimental place are surrounded by the fifth heat shield and form a fifth cooling level, wherein the fifth cold plate and the fifth heat shield are enclosed by the fourth heat shield such that the fifth cooling level is enclosed by the fourth cooling level, wherein the vacuum chamber encloses the first cooling level, the second cooling level, the third cooling level, the fourth cooling level and the fifth cooling level, wherein the cryo-cooler comprises a fifth cooler portion, wherein the fifth cooler portion is thermally coupled by a fifth heat conductor to the fifth cold plate, wherein the first cold plate, the second cold plate, the third cold plate, the fourth cold plate and the fifth cold plate are arranged side by side in the same plane, and wherein the first experimental place, the second experimental place, the third experimental place, the fourth experimental place and the fifth experimental place are arranged side by side such that they are accessible after removal of the first heat shield, the second heat shield, the third heat shield, the fourth heat shield and the fifth heat shield from all sides except from the side of the first cold plate, the second cold plate, the third cold plate, the fourth cold plate and the fifth cold plate.

11. The cryostat of claim 10, wherein the fifth cooler portion is selected from the group consisting of: a 1-K pot, a $^3He$ level refrigerator, a $^3He/^4He$ dilution refrigerator, and an adiabatic demagnetization refrigerator (ADR) cooler.

12. The cryostat of claim 10, further comprising:

a $^3He/^4He$ dilution refrigerator, wherein the fourth cooler portion is a still of the $^3He/^4He$ dilution refrigerator, and wherein the fifth cooler portion is a mixing chamber of the $^3He/^4He$ dilution refrigerator.

13. A cryostat, comprising:

a first cold plate that forms a first base of a first experimental place, wherein the first cold plate is oriented horizontally;

a first heat shield that encloses the first experimental place, wherein the first cold plate and the first experimental place are surrounded by the first heat shield and form a first cooling level;

a second cold plate that forms a second base of a second experimental place;

a second heat shield that encloses the second experimental place, wherein the second cold plate and the second experimental place are surrounded by the second heat shield and form a second cooling level, and wherein the second cold plate and the second heat shield are enclosed by the first heat shield such that the second cooling level is enclosed by the first cooling level;

a vacuum chamber that encloses the first cooling level and the second cooling level; and a cryo-cooler that is thermally coupled to the first cold plate and the second cold plate, wherein the second cold plate is oriented parallel to the first cold plate, wherein the second cold plate is arranged above the first cold plate and at least partially laterally overlaps the first cold plate, wherein a portion of the first cold plate protrudes laterally out from under the second cold plate such that the laterally protruding portion of the first cold plate is accessible from above, and wherein the laterally protruding portion of the first cold plate forms the first base for the first experimentation place.

14. The cryostat of claim 13, further comprising:

a first partial cold plate mechanically supported by the laterally protruding portion of the first cold plate, wherein the first partial cold plate is offset above the laterally protruding portion of the first cold plate, wherein the first partial cold plate is thermally coupled by a heat conductor to the first cold plate, and wherein the first partial cold plate and the second cold plate are arranged side by side in the same plane.

15. The cryostat of claim 14, further comprising:

a third cold plate that forms a third base of a third experimental place; and a third heat shield that encloses the third experimental place, wherein the third cold plate and the third experimental place are surrounded by the third heat shield and form a third cooling level, wherein the third cold plate and the third heat shield are enclosed by the second heat shield such that the third cooling level is enclosed by the second cooling level, wherein the vacuum chamber encloses the first cooling level, the second cooling level and the third cooling level, wherein the cryo-cooler is thermally coupled to the first cold plate, the second cold plate and the third cold plate, wherein the third cold plate is arranged above the second cold plate and at least partially laterally overlaps the second cold plate, wherein a portion of the second cold plate protrudes laterally out from under the third cold plate such that the laterally protruding portion of the second cold plate is accessible from above, and wherein the laterally protruding portion of the second cold plate forms the second base for the second experimentation place.

16. The cryostat of claim 15, further comprising:

a fourth cold plate that forms a fourth base of a fourth experimental place; and a fourth heat shield that encloses the fourth experimental place, wherein the fourth cold plate and the fourth experimental place are surrounded by the fourth heat shield and form a fourth cooling level, wherein the fourth cold plate and the fourth heat shield are enclosed by the third heat shield such that the fourth cooling level is enclosed by the third cooling level, wherein the vacuum chamber encloses the first cooling level, the second cooling level, the third cooling level and the fourth cooling level, wherein the cryo-cooler is thermally coupled to the first cold plate, the second cold plate, the third cold plate and the fourth cold plate, wherein the fourth cold plate is arranged above the third cold plate and at least partially laterally overlaps the third cold plate, wherein a portion of the third cold plate protrudes laterally out from under the fourth cold plate such that the laterally protruding portion of the third cold plate is accessible from above, and wherein the laterally protruding portion of the third cold plate forms the third base for the third experimentation place.

17. The cryostat of claim 16, further comprising:

a fifth cold plate that forms a fifth base of a fifth experimental place; and a fifth heat shield that encloses the fifth experimental place, wherein the fifth cold plate and the fifth experimental place are surrounded by the fifth heat shield and form a fifth cooling level, wherein the fifth cold plate and the fifth heat shield are enclosed by the fourth heat shield such that the fifth cooling level is enclosed by the fourth cooling level, wherein the vacuum chamber encloses the first cooling level, the second cooling level, the third cooling level, the fourth cooling level and the fifth cooling level, wherein the cryo-cooler is thermally coupled to the first cold plate, the second cold plate, the third cold plate, the fourth cold plate and the fifth cold plate, wherein the fifth cold plate is arranged above the fourth cold plate and at least partially laterally overlaps the fourth cold plate, wherein a portion of the fourth cold plate protrudes laterally out from under the fifth cold plate such that the laterally protruding portion of the fourth cold plate is accessible from above, and wherein the laterally protruding portion of the fourth cold plate forms the fourth base for the fourth experimentation place.

* * * * *